United States Patent [19]

Lynn

[11] 3,910,742
[45] Oct. 7, 1975

[54] APPARATUS FOR REMOVING WASTE MATERIAL FROM A PLASTIC ARTICLE

[75] Inventor: Kenneth N. Lynn, Overland Park, Kans.

[73] Assignee: Ethyl Development Corporation, Kansas City, Mo.

[22] Filed: Nov. 21, 1973

[21] Appl. No.: 417,925

Related U.S. Application Data

[63] Continuation of Ser. No. 217,788, Jan. 24, 1972, abandoned.

[52] U.S. Cl............. 425/302 B; 225/101; 425/806; 425/DIG. 212
[51] Int. Cl.².......................................... B29C 17/14
[58] Field of Search....... 425/DIG. 212, 302 B, 806; 225/101

[56] References Cited
UNITED STATES PATENTS

| | | | |
|---|---|---|---|
| 2,890,483 | 6/1959 | Soubier | 425/806 |
| 3,040,376 | 6/1962 | Elphee | 225/101 X |
| 3,363,282 | 1/1968 | Hagen | 425/216 |
| 3,417,428 | 12/1968 | Rupert | 425/308 X |
| 3,464,084 | 9/1969 | Thompson | 425/308 |
| 3,650,653 | 3/1972 | Erickson | 425/806 |

FOREIGN PATENTS OR APPLICATIONS

| | | | |
|---|---|---|---|
| 631,708 | 6/1959 | Italy | 425/806 |

*Primary Examiner*—Francis S. Husar
*Assistant Examiner*—Carl Rowold
*Attorney, Agent, or Firm*—Donald L. Johnson; John F. Sieberth; E. Donald Mays

[57] ABSTRACT

An apparatus for blow molding hollow plastic articles to provide a finished base in the molding step. A plastic parison is received between separable mold halves, each of which has a tail removal subassembly attached thereto. Each subassembly is provided with a movable grasping arm which engages the tail of the parison when the mold halves are in the closed position. During the molding step, the two cooperating grasping arms exert an axially directed force on the tail to sever it from the hollow article being formed.

11 Claims, 6 Drawing Figures

APPARATUS FOR REMOVING WASTE MATERIAL FROM A PLASTIC ARTICLE

This is a continuation of application Ser. No. 217,788, filed Jan. 24, 1972, now abandoned.

BACKGROUND OF THE INVENTION

1. Field of the Invention

This invention relates to an apparatus for blow molding plastic articles with a finished base.

2. Description of the Prior Art

In the blow molding of plastic bottles, it has long been an objective to produce a bottle with a completely finished base in the blowing step. Earlier methods and apparatuses for producing bottles from tubular parisons have not been completely effective in the removal of the tail from the bottle subsequent to the blowing step. It is often necessary to subject the bottle to a secondary finishing operation to completely finish the base of the bottle. A number of methods and apparatuses have been proposed for severing the tail from the bottle. In U.S. Pat. No. 2,994,103 there is disclosed an apparatus that removes the waste portion from the blown plastic article while the article is supported by the mold. However, to initiate the removal process, the mold must be partially opened. This step requires additional time and results in lower output. The apparatuses described in U.S. Pat. Nos. 3,098,593; 3,172,152; 3,351,981; 3,465,931; and 3,486,190 all require that the article be removed from the mold to a waste removal station. The articles are removed to the waste removal station by a variety of methods, none of which utilize grasping the waste portion. U.S. Pat. Nos. 3,040,376; 3,266,083; 3,417,428; 3,464,084; and 3,506,171 also require that the article be removed from the mold and taken to a waste removal station. However, these patents do make use of the waste portion by engaging the waste to remove the article to the station. All of the above-mentioned patents require either that the article be removed from the mold before removing the waste or that the mold be partially opened before the waste is removed. U.S. Pat. No. 3,363,282 discloses an apparatus for removing the waste from a blown plastic article while the article is still in the closed mold. However, the apparatus does not possess the required versatility for attachment to a variety of different blow molds. The apparatus has to be mounted on the side of the mold cavity which will result in a requirement for more lateral space when the mold is open.

From the foregoing, it can be seen that the blow molding industry is in need of an apparatus for completely removing the tail of a plastic article while the article is retained within the mold cavity and that such apparatus be relatively inexpensive and simple and that it possess the versatility to enable it to be used on a variety of existing blow molding machines.

SUMMARY OF THE INVENTION

It is an object of the present invention to provide an apparatus for blow molding plastic containers which produces a container with a finished base during the molding step.

It is another object of the present invention to provide an apparatus for blow molding plastic containers which produces bottles having a finished base completely free of flash or scrap plastic material.

It is still another object of the present invention to provide an apparatus for blow molding plastic containers having a completely finished base, which apparatus is simple in construction and inexpensive.

It is also an object of the present invention to provide an apparatus for blow molding plastic containers which can produce bottles with finished bases having different configurations.

It is a further object of the present invention to provide an apparatus for blow molding plastic containers with completely finished bases that is compatible with a variety of different-sized molds.

The foregoing objects and other advantages that are brought out hereinafter are realized in the apparatus aspects of the present invention in an apparatus for forming hollow plastic articles with in-mold finished bases from tubular plastic parisons, which apparatus includes a split, hollow blow mold for receiving the parison, the blow mold providing the structure on which is mounted on movable tail removal assembly. The tail removal assembly has pivotably mounted grasping arms which are activated by means of double-acting power cylinders.

Some of the advantages of the apparatus of the present invention include the ability to completely form a finished base on the hollow article within the mold during the blowing step without leaving any waste plastic moil which must be subsequently removed after the bottle is blown. The apparatus provides a simple mechanical arrangement for producing a finished base on a container during the blowing step and thereby eliminates the need for elaborate mechanisms for opening the mold, moving the article to another station for tail removal and pulling the tail. Also, the blown article can be cooling while the tail is being pulled since the mold halves are not opened. Another important advantage of the apparatus is that it can be used with almost any blow molding machine now in operation without expensive and elaborate adaptation due to the fact that the apparatus is easily adjusted to fit all sizes of blow molds. Also, by having the tail removed while the container is being blown, production can be increased since additional steps are not required for finishing the hollow article.

DESCRIPTION OF THE PREFERRED EMBODIMENTS

Figure 1:
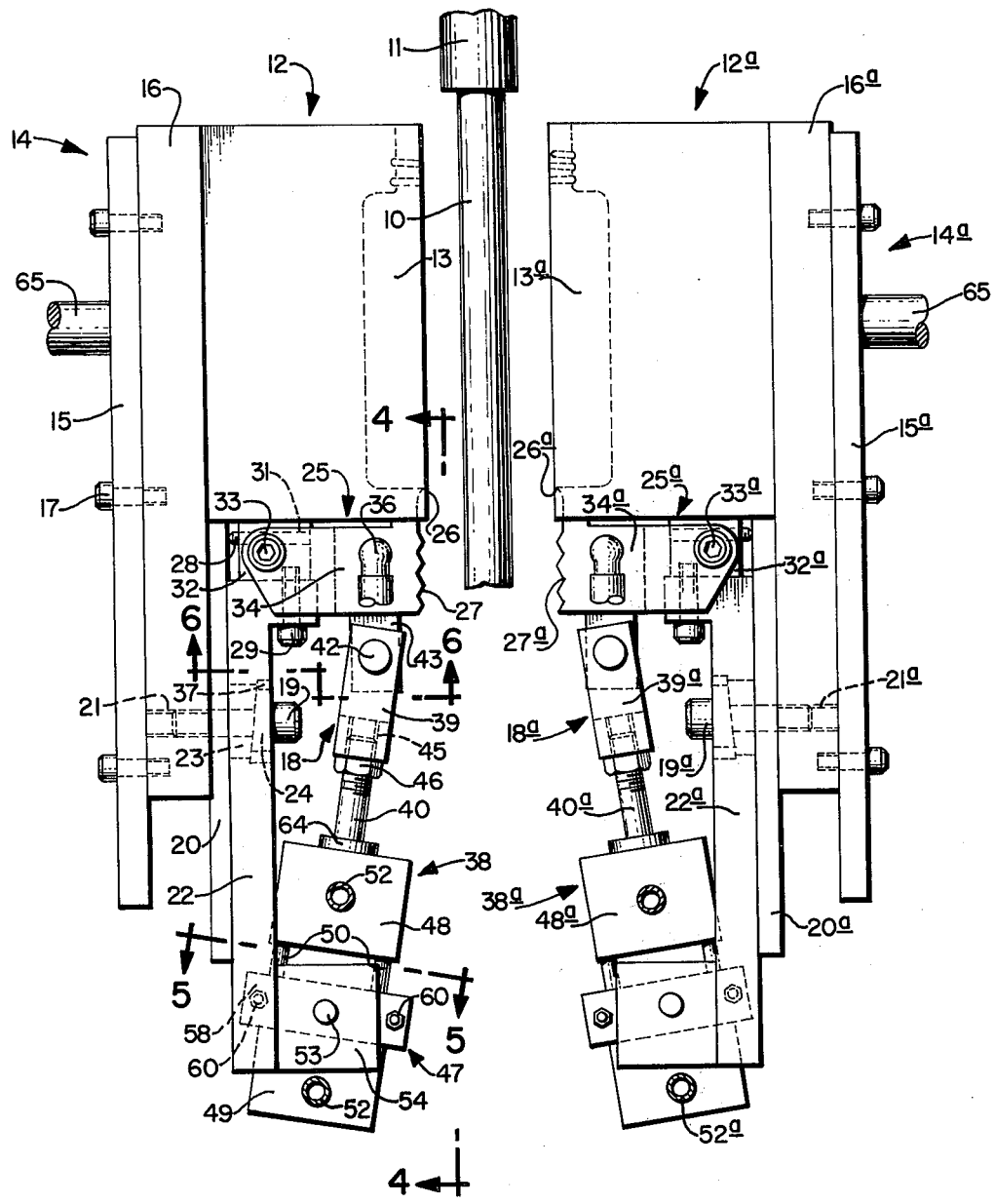
FIG. 1 is an elevational view of a split blow mold in the open position with a tail removal assembly constructed in accordance with the present invention in position to engage the tail of the parison.
Figure 2:
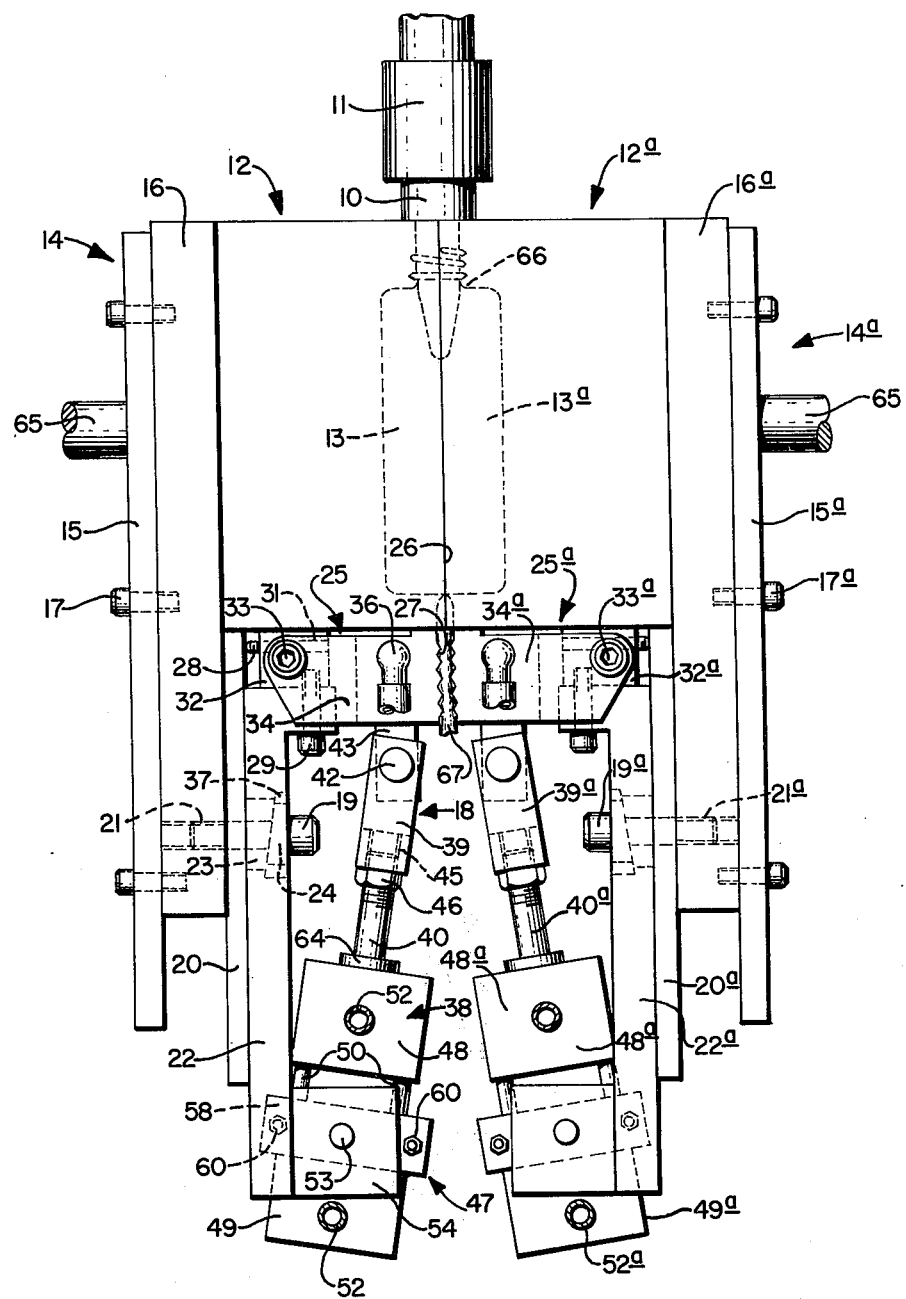
FIG. 2 is an elevational view of the split blow mold of FIG. 1 in the closed position with the tail removal assembly in the closed position engaging the tail of the extruded parison.

Referring now to FIGS. 1–4, there is shown one embodiment for a blow molding apparatus for carrying out the present invention. FIG. 1 depicts the position of the apparatus during the parison extrusion step. The plastic parison 10 is forced from the extruder head 11 and is positioned between a split blow mold having a left half 12 and a right half 12a which are shown in the open position. The mold halves 12 and 12a have mold cavities 13 and 13a, respectively, which are shaped to the form of the plastic article to be blown. The mold halves 12 and 12a are supported by mold support structures, designated generally by the numerals 14 and 14a, which include platens 15 and 15a and back plates 16 and 16a connected by means of bolts 17. The mold support structures extend below the mold halves in order to allow the tail-grasping assembly, which includes left and right subassemblies designated generally by the numerals 18 and 18a, to be attached to the mold support structures by vertical positioning bolts 19 and 19a which are received in threaded cylindrical openings 21 and 21a in back plates 16 and 16a. Vertical slots 23—23 and 23a—23a in the tail-grasping subassembly support plates 22 and 22a receive bolts 19—19 and 19a—19a and allow vertical adjustment of the support plates 22 and 22a. Recessed surfaces 37—37 and 37a—37a surrounding slots 23—23 and 23a—23a are inclined to align with chamfer blocks 24—24 and 24a—24a which are carried on bolts 19—19 and 19a—19a. By tightening bolts 19—19 and 19a—19a, force is applied to the chamfer blocks 24—24 and 24a—24a causing the assembly support plates 22 and 22a to move in an upward direction, thereby insuring that the pivotably mounted grasping arms, designated generally by numerals 25 and 25a, are positioned directly beneath the mold halves 12 and 12a. To insure alignment of the gripping faces 27 and 27a of tail-grasping subassemblies 18 and 18a with the vertical cutting edges 26 and 26a of the mold halves 13 and 13a, there is interposed between the back plates 16 and 16a and the tail-grasping assembly support plates 22 and 22a spacers 20 and 20a. To obtain the correct position of the tail-gripping faces 27 and 27a to insure that these faces will completely engage the tail when the mold is in the closed position, as shown in FIG. 2, there are also provided horizontal adjustment screws 28 and 28a.

Figure 4:
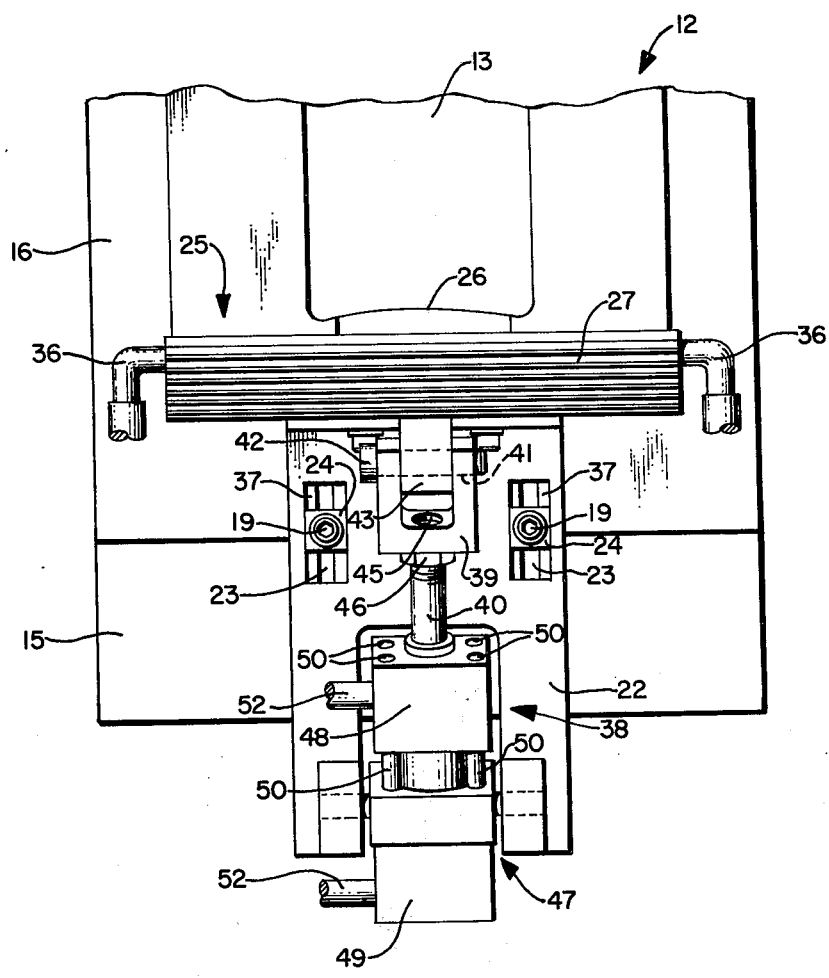
FIG. 4 is a broken, partial, front view of FIG. 1 taken along line 4—4.
Figure 6:
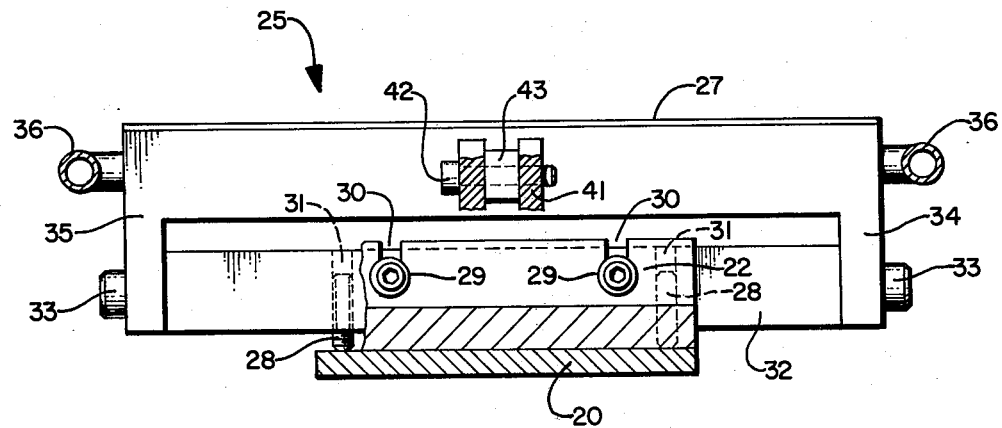
FIG. 6 is a cross-sectional view of FIG. 1 taken along line 6—6.

Referring now to FIGS. 1, 4 and 6, these screws 28 and 28a are positioned in transverse threaded holes 31 and 31a in the grasping arm support blocks 32 and 32a. By adjusting the position of the screws to engage with spacers 20 and 20a, the grasping arms 25 and 25a can be moved in the horizontal direction whereby the arms are brought into proper alignment. The grasping arm support blocks 32 and 32a are mounted on the tail-grasping assembly support plates 22 and 22a by locking bolts 29—29 and 29a—29a which are positioned in slots 30—30 and 30a—30a in the assembly support blocks 22 and 22a. These bolts are used to lock the grasping arms into position after the final alignment has been made. The grasping arms 25 and 25a are pivotably mounted on the grasping arm support blocks 32 and 32a by means of bolts 33 and 33a threaded on one end (not shown). Each end of the tail-grasping arms 25 and 25a has ears 34, 35, 34a and 35a which extend rearwardly and receive the bolts 33 and 33a which pass through the ears and into the support blocks 32 and 32a.

Referring now to FIG. 4, the gripping faces 27 and 27a of the pivotably mounted grasping arms 25 and 25a are ribbed in the horizontal direction so as to insure a good gripping surface. A cooling medium is circulated through the hollow bore (not shown) provided in grasping arms 25 and 25a by cooling tubes 36 and 36a. The cool face assures the rigidity of the tail so that it might be severed more easily. The grasping arms 25 and 25a are connected to the double-acting cylinders 38 and 38a by means of pivotably mounted, U-shaped connectors 39 and 39a adjustably attached to connecting rods 40 and 40a. As seen in FIG. 6, the upper ends of the connectors 39 and 39a have a transverse hole which aligns with a transverse hole in downwardly projected shafts 43 and 43a of the grasping arms 25 and 25a to form continuous transverse holes 41 and 41a through which connecting pins 42 and 42a pass and are received in transverse holes 41 and 41a in the upper ends of the U-shaped connectors 39 and 39a. The base of connectors 39 and 39a has threaded holes 45 and 45a which receive the threaded ends of the connecting rods 40 and 40a. At the juncture of the U-shaped connectors 39 and 39a and the connecting rods 40 and 40a, there are locking nuts 46 and 46a threaded onto the connecting rods 40 and 40a to aid in positioning the double-acting cylinders 38 and 38a.

The double-acting cylinders are pivotably mounted on the tail-grasping assembly support plates 22 and 22a by means of trunnion blocks 47 and 47a. The double-acting cylinders include top end blocks 48 and 48a and bottom end blocks 49 and 49a. The double-acting cylinders 38 and 38a contain pistons 63 and 63a which are activated by a fluid pressure supply entering and exiting through pressure tubes 52 and 52a connected to each of the end blocks 48, 48a, 49 and 49a. The end blocks 48, 48a, 49 and 49a are held in position relative to each other by spacing rods 50 and 50a.

Figure 5:
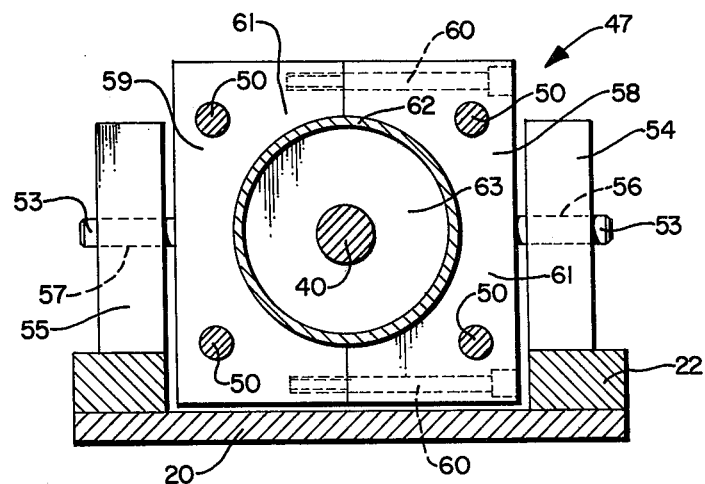
FIG. 5 is a cross-sectional view of FIG. 1 taken along line 5—5.

Referring now to FIG. 5, the trunnion blocks 47 and 47a are pivotally connected to the tail-grasping assembly support plates 22 and 22a by means of bolts 53 and 53a threaded on one end (not shown). Each side of the support plates 22 and 22a is provided with ears 54, 54a, 55 and 55a which extend forward and provide transverse holes 56, 56a, 57 and 57a which align with holes in the sides of the trunnion blocks so that the pins 53 and 53a may pass through and be received in trunnion blocks 47 and 47a. Left and right trunnion blocks are formed from two half sections 58, 58a and 59, 59a, respectively, held together by screws 60 and 60a. The half circle cavities 61—61 and 61a—61a in the trunnion blocks form a cylindrical cavity which receives cylinders 62 and 62a which are a part of the double-acting cylinder assemblies 38 and 38a. Inside the cylinders 62 and 62a are pistons 63 and 63a and connecting rods 40 and 40a pass through seals 64 and 64a to connect with the U-shaped connectors 39 and 39a as described above (see FIG. 1).

Figure 3:
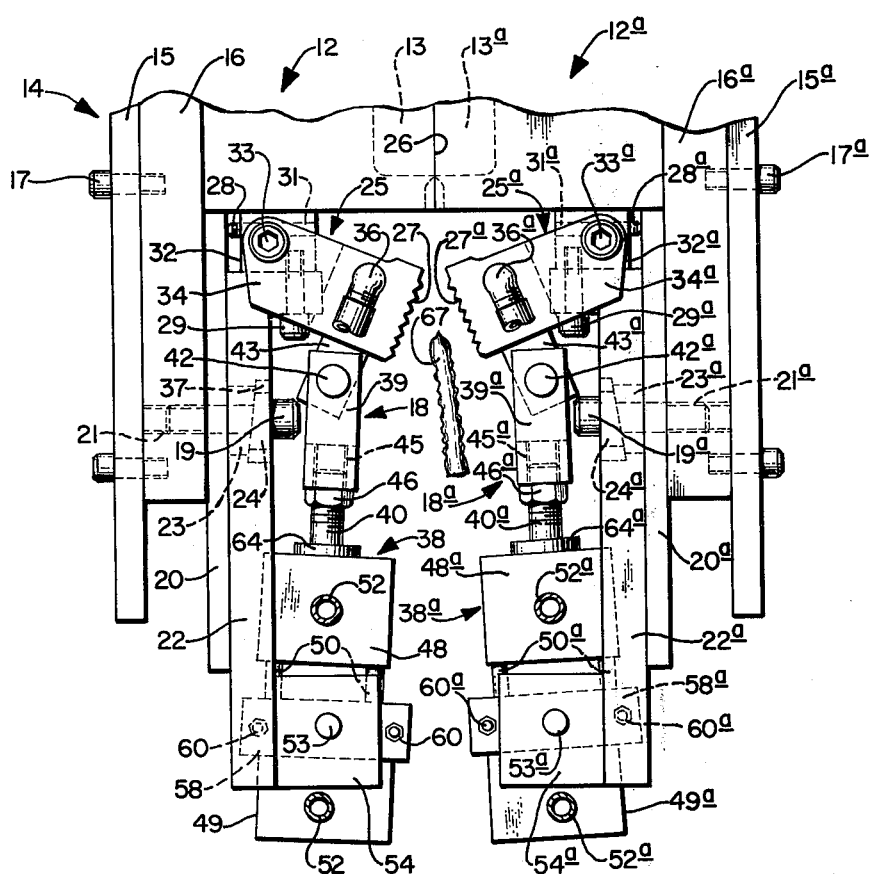
FIG. 3 is a partial, elevational view of the apparatus of the present invention showing the position of the tail removal assembly after the pivotably mounted grasping arms have removed the tail from the hollow article in the mold.

In operation, the parison 10 is extruded from the extruder head 11 and is allowed to move to a position between the open mold halves 12 and 2a, as seen in FIG. 1. The platens 15 and 15a are moved to a closed position by the push rods 65—65 which allow the parison 10 to be enclosed by the mold halves 12 and 12a and, at the same time, allow the pivotably mounted tail-grasping arms 25 and 25a to engage the tail moil 67 of the extruded parison 10, as seen in FIG. 2. Air is introduced through the hollow mandrel 66 to blow the article to the shape defined by cavities 13 and 13a. The double-acting cylinders 38 and 38a are activated causing the connecting rods 40 and 40a to exert a downward force on the tail-grasping arms 25 and 25a, which move in the path of an arc, causing the tail moil 67 to be severed from the article being blown and allowing it to fall into a waste container (not shown), as seen in FIG. 3. When the blowing operation has ceased, the mold halves 12 and 12a are opened and the double-acting cylinders 38 and 38a are again activated causing connecting rods 40 and 40a to exert an upward force on the tail-grasping arms 25 and 25a to return them to the up position ready to engage the next parison tail.

From the foregoing, it can be seen that the apparatus of the present invention provides a system for producing hollow plastic containers made from thermoplastic materials, for example, material such as polyethylene, polypropylene and polyvinyl chloride, wherein the base of the container is completely finished within the mold during the blow molding step.

There has been described what is considered preferred embodiments for practicing the present invention; however, it will be understood that other methods and apparatuses may be utilized for carrying out the invention. The invention is to be limited solely by the claims.

What is claimed is:

1. In an apparatus for blow molding hollow, plastic articles from tubular plastic parisons which includes a split blow mold having two halves, two individual mold suport means, one of each support means being attached to one of each individual mold half and extending below the bottom forming end of the respective mold half, power means to move each individual support means and each associated mold half to open and close said split blow mold; said hollow plastic article while being enclosed and supported by said mold halves having a tail attached thereto which depends from the bottom forming ends of said mold halves; an improved tail grasping assembly for removing said tail from said hollow article comprising:

a. a first and a second assembly support means, said first assembly support frames being adjustably attached to one of said two mold support means and said second assembly support frame being attached to the other of said mold support means, said first and second assembly support frames being positioned below said bottom-forming ends of said mold halves;
   b. first and second fluid power cylinders, said first fluid power cylinder being attached to said first assembly support frame and said second fluid power cylinder being attached to said second support frame, said first and second cylinders each having a piston rod extending therefore towards said bottom-forming end of said mold halves; and
   c. first and second grasping arms, said first grasping arm being pivotally attached to said first assembly support and to said first piston rod, and said second grasping arm being pivotally attached to said second assembly support frame and to said second piston rod, said first and second grasping arms being located immediately adjacent to the bottom-forming end of said mold halves and together adapted to engage between them the depending tail for removal from said hollow article upon actuation of said first and second fluid power cylinders.

2. The apparatus of claim 1 wherein the mold support means is a platen attached to a backplate.

3. The apparatus of claim 2 wherein said platen and backplate both extend outwardly from the bottom forming ends of the respective mold half.

4. The apparatus of claim 28 wherein said grasping arms are adjustably mounted on said assembly support frames.

5. The apparatus of claim 1 wherein said grasping arms are provided with fluid passages for circulation of a cooling fluid.

6. The apparatus of claim 1 wherein there is interposed between each one of said assembly support frames and each one of said mold support means a spacer attached to the respective mold support means.

7. The apparatus of claim 1 wherein each one of said assembly support frames is attached to the respective mold support means by a positioning bolt.

8. The apparatus of claim 7 wherein each one of said assembly support frames is adjustable toward or away from its respective mold half by chamfer surface means.

9. The apparatus of claim 1 wherein each one of said fluid power cylinders is a double-acting cylinder and is pivotably mounted on its respective assembly support frame.

10. The apparatus of claim 9 wherein each one of said double-acting cylinders is mounted on its respective support frame by a trunnion block.

11. The apparatus of claim 10 wherein said double-acting cylinders are adjustably mounted in said trunnion blocks.

\* \* \* \* \*

UNITED STATES PATENT OFFICE
CERTIFICATE OF CORRECTION

PATENT NO. : 3,910,742
DATED : October 7, 1975
INVENTOR(S) : Kenneth N. Lynn

It is certified that error appears in the above-identified patent and that said Letters Patent are hereby corrected as shown below:

Column 6, line 5, reads "therefore", should read --therefrom--;
Column 6, line 23 reads "28", should read --1--.

Signed and Sealed this

Ninth Day of November 1976

[SEAL]

Attest:

RUTH C. MASON
Attesting Officer

C. MARSHALL DANN
Commissioner of Patents and Trademarks